US012051960B2

(12) United States Patent
Nishida et al.

(10) Patent No.: US 12,051,960 B2
(45) Date of Patent: Jul. 30, 2024

(54) ROTATING ELECTRICAL MACHINE CASE

(71) Applicants: HONDA MOTOR CO., LTD., Tokyo (JP); HITACHI ASTEMO, LTD., Ibaraki (JP)

(72) Inventors: Atsushi Nishida, Saitama (JP); Keiichiro Kashiwabara, Saitama (JP); Akira Fujiwara, Ibaraki (JP); Sachio Kawada, Ibaraki (JP); Hideaki Noto, Ibaraki (JP); Shunsuke Isogai, Ibaraki (JP)

(73) Assignees: HONDA MOTOR CO., LTD., Tokyo (JP); HITACHI ASTEMO, LTD., Ibaraki (JP)

( * ) Notice: Subject to any disclaimer, the term of this patent is extended or adjusted under 35 U.S.C. 154(b) by 305 days.

(21) Appl. No.: 17/623,780

(22) PCT Filed: Jun. 29, 2020

(86) PCT No.: PCT/JP2020/025542
§ 371 (c)(1),
(2) Date: Dec. 29, 2021

(87) PCT Pub. No.: WO2021/002329
PCT Pub. Date: Jan. 7, 2021

(65) Prior Publication Data
US 2022/0247253 A1 Aug. 4, 2022

(30) Foreign Application Priority Data
Jul. 2, 2019 (JP) .................................. 2019-123959

(51) Int. Cl.
*H02K 5/04* (2006.01)
*H02K 5/00* (2006.01)
(Continued)

(52) U.S. Cl.
CPC ................. *H02K 5/04* (2013.01); *H02K 5/00* (2013.01); *H02K 5/15* (2013.01); *H02K 5/16* (2013.01);
(Continued)

(58) Field of Classification Search
CPC .............. H02K 5/06; H02K 5/04; H02K 5/24; H02K 5/15; H02K 5/161; H02K 2213/03;
(Continued)

(56) References Cited

U.S. PATENT DOCUMENTS 8,502,436 B2   8/2013  Wilson, Jr. et al.
9,621,010 B2 * 4/2017  Stillger .................... H02K 9/14
(Continued)

FOREIGN PATENT DOCUMENTS

CN       103545966 A    1/2014
CN       206619985 U   11/2017
(Continued)

OTHER PUBLICATIONS

Zuo et al, The End Cover and the Washing Motor of Washer Motor, Jun. 12, 2018, CN 207490645 (English Machine Translation) (Year: 2018).*

(Continued)

Primary Examiner — Alexander A Singh
(74) Attorney, Agent, or Firm — Paratus Law Group, PLLC

(57) ABSTRACT

A rotating electrical machine case includes a case body having a cylindrical shape surrounding a rotating electrical machine and a side wall portion provided on at least one end side of the case body in a rotation axis direction. The side wall portion is provided with a plurality of ribs extending in a radial direction when viewed from the rotation axis direction of a rotating electrical machine and the plurality of ribs include ribs having different circumferential widths.

8 Claims, 2 Drawing Sheets

(51) Int. Cl.
- *H02K 5/15* (2006.01)
- *H02K 5/16* (2006.01)
- *B60K 1/00* (2006.01)
- *B60L 50/51* (2019.01)

(52) U.S. Cl.
CPC .............. *B60K 1/00* (2013.01); *B60L 50/51* (2019.02); *B60L 2220/50* (2013.01)

(58) Field of Classification Search
CPC ........... H02K 5/207; H02K 5/00; H02K 5/02; H02K 5/16; B60K 1/00; B60L 50/51; B60L 2220/50
USPC .......................................................... 310/89
See application file for complete search history.

(56) References Cited

U.S. PATENT DOCUMENTS

| | | | |
|---|---|---|---|
| 2007/0138879 A1* | 6/2007 | Aoshima | H02K 9/06 310/263 |
| 2008/0023260 A1 | 1/2008 | Eilers | |
| 2012/0206022 A1 | 8/2012 | Wilson, Jr. et al. | |
| 2017/0366062 A1 | 12/2017 | Matsuda et al. | |
| 2018/0287451 A1 | 10/2018 | Wang | |

FOREIGN PATENT DOCUMENTS

| | | | | |
|---|---|---|---|---|
| CN | 206673734 U | | 11/2017 | |
| CN | 207490645 U | * | 6/2018 | ............ H02K 11/20 |
| CN | 207490645 U | | 6/2018 | |
| DE | 102013227056 A1 | | 6/2015 | |
| FR | 2981621 A1 | | 4/2013 | |
| JP | S58-172356 U | | 11/1983 | |
| JP | 2000-032698 A | | 1/2000 | |
| JP | 2014-138529 A | | 7/2014 | |
| JP | 6140627 B2 | | 5/2017 | |
| WO | WO 2004/055956 A2 | | 7/2004 | |
| WO | WO 2017/068674 A1 | | 4/2017 | |

OTHER PUBLICATIONS

May 17, 2023, European Communication issued for related EP Application No. 20834387.1.
Aug. 31, 2023, Translation of Chinese Office Action issued for related CN Application No. 202080047703.3.
Aug. 12, 2022, European Search Report issued for related EP Application No. 20834387.1.
Sep. 1, 2020, International Search Report issued for related PCT Application No. PCT/JP2020/025542.
Sep. 1, 2020, International Search Opinion issued for related PCT Application No. PCT/JP2020/025542.
Oct. 31, 2023, translation of Japanese Office Action issued for related JP Application No. 2021-530019.

* cited by examiner

ROTATING ELECTRICAL MACHINE CASE

CROSS REFERENCE TO PRIOR APPLICATION

This application is a National Stage Patent Application of PCT International Patent Application No. PCT/JP2020/025542 (filed on Jun. 29, 2020) under 35 U.S.C. § 371, which claims priority to Japanese Patent Application No. 2019-123959 (filed on Jul. 2, 2019), which are all hereby incorporated by reference in their entirety.

TECHNICAL FIELD

The present invention relates to a rotating electrical machine case mounted on an electric vehicle or the like.

BACKGROUND ART

A rotating electrical machine case mounted on an electric vehicle or the like is provided with a case body having a cylindrical shape surrounding a rotating electrical machine and a side wall portion provided on at least one end side of the case body in a rotation axis direction. The side wall portion is provided with a plurality of ribs extending in a radial direction when viewed from the rotation axis direction of the rotating electrical machine and the plurality of ribs improve rigidity of the rotating electrical machine case (see, for example, FIGS. 7 and 8 of Patent Literature 1).

CITATION LIST

Patent Literature

Patent Literature 1: Japanese Patent No. 6140627

SUMMARY OF INVENTION

Technical Problem

However, the rotating electrical machine case described in Patent Literature 1 has room for improvement in terms of rigidity. In addition, the rib of the rotating electrical machine case is expected to be used for other purposes.

A first object of the invention is to provide a rotating electrical machine case capable of improving rigidity and suppressing an increase in weight.

A second object of the invention is to provide a rotating electrical machine case in which a rib required for improving rigidity has other functions.

Solution to Problem

A first invention is a rotating electrical machine case which accommodates a rotating electrical machine, the rotating electrical machine case includes,
a case body having a cylindrical shape surrounding the rotating electrical machine, and
a side wall portion provided on at least one end side of the case body in a rotation axis direction, in which:
the side wall portion is provided with a plurality of ribs extending in a radial direction when viewed from the rotation axis direction; and
the plurality of ribs include ribs having different circumferential widths.

A second invention is a rotating electrical machine case which accommodates a rotating electrical machine, the rotating electrical machine case includes,
a case body having a cylindrical shape surrounding the rotating electrical machine, and
a side wall portion provided on at least one end side of the case body in a rotation axis direction, in which:
the side wall portion is provided with a rib extending in a radial direction when viewed from the rotation axis direction; and
information is displayed on the rib.

Advantageous Effects of Invention

According to the first invention, the rigidity of the rotating electrical machine case can be improved and the increase in weight can be suppressed.

Further, according to the second invention, the rib required for improving the rigidity can be provided with an information display function.

DESCRIPTION OF EMBODIMENT

Figure 1:
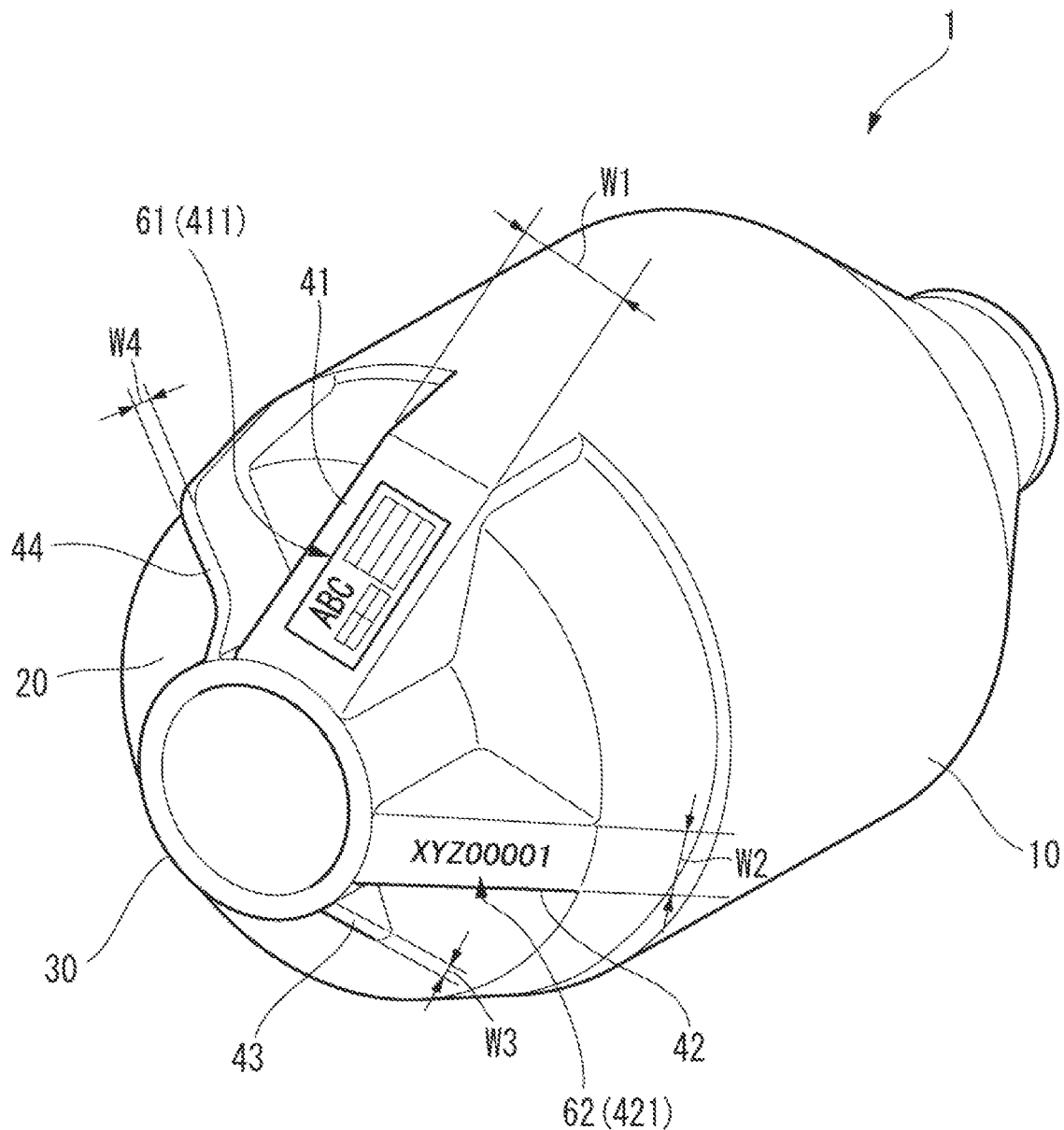
FIG. 1 is a perspective view illustrating a rotating electrical machine case according to an embodiment of the invention.

Hereinafter, a rotating electrical machine case according to an embodiment of the invention will be described with reference to FIGS. 1 and 2.

(Rotating Electrical Machine Case)

Figure 2:
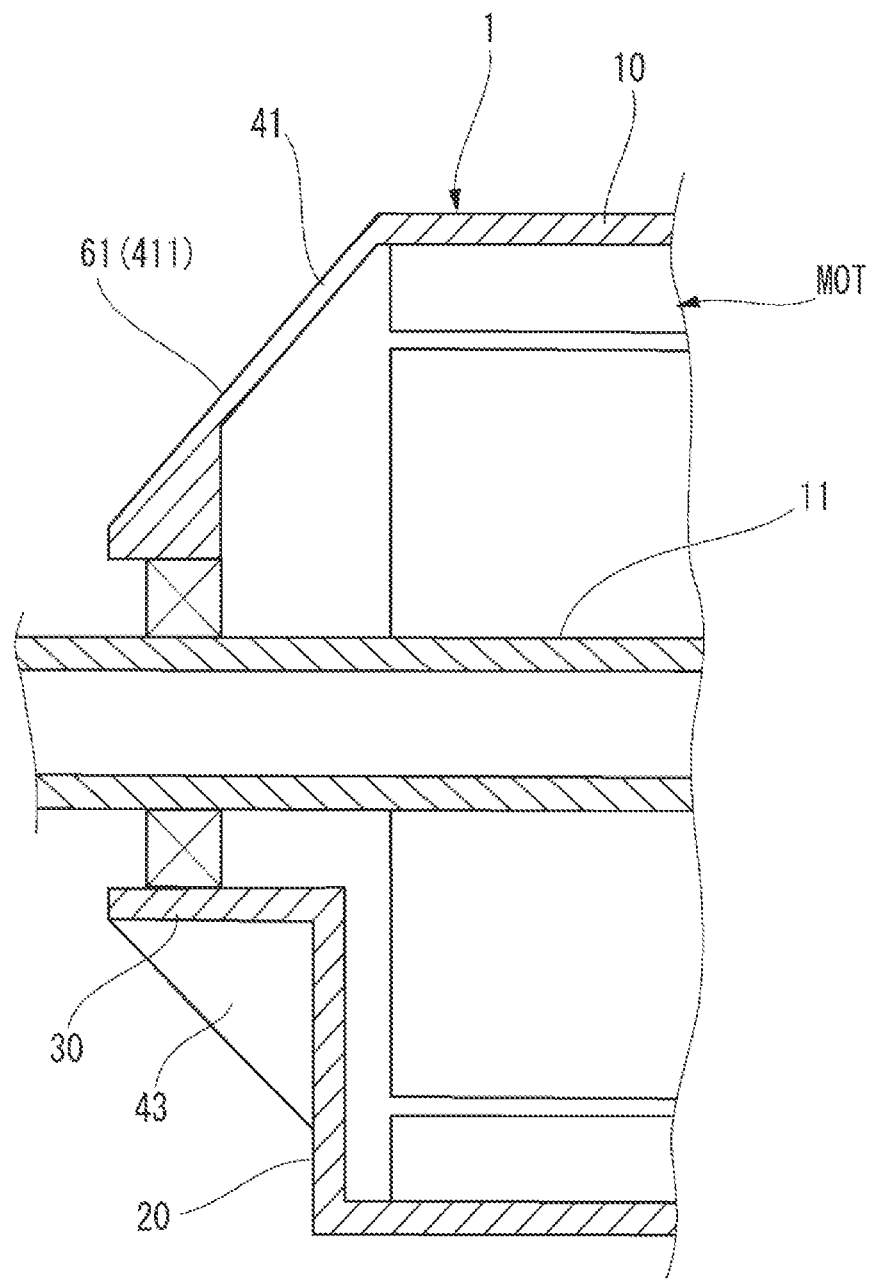
FIG. 2 is a cross-sectional view of the rotating electrical machine case of FIG. 1 accommodating the rotating electrical machine.

As illustrated in FIG. 2, a rotating electrical machine case 1 accommodates a rotating electrical machine MOT and is mounted on an electric vehicle as, for example, a front wheel drive device or a rear wheel drive device. As illustrated in FIGS. 1 and 2, the rotating electrical machine case 1 of the embodiment includes a case body 10 having a cylindrical shape surrounding the rotating electrical machine, a side wall portion 20 provided on at least one end side of the case body 10 in a direction (hereinafter, a rotation axis direction) in which a rotation shaft 11 of the rotating electrical machine MOT extends, a shaft support portion 30 which has a cylindrical shape extending in a direction away from the side wall portion 20 along the rotation axis direction and surrounding the rotation shaft 11, and a plurality of ribs 41 to 44 provided on the side wall portion 20 and extending in a radial direction when viewed from the rotation axis direction. More specifically, the plurality of ribs 41 to 44 extend radially outward from an outer peripheral surface of the shaft support portion 30 and integrally connect the shaft support portion 30 and the side wall portion 20. Hereinafter, the plurality of ribs 41 to 44, which are main parts of the invention, will be described in detail.

(Plurality of Ribs)

The plurality of ribs 41 to 44 include first to fourth ribs 41 to 44 arranged at predetermined intervals in a circumferential direction. Circumferential widths W1, W2, W3, and W4 of the first to fourth ribs 41 to 44 are not uniform and there are at least two kinds of circumferential widths. According to such a rotating electrical machine case 1, by making the ribs 41 and 42, which require rigidity, thicker than the other ribs 43 and 44, it is possible to improve the rigidity and suppress an increase in weight. Further, when casting the rotating electrical machine case 1, a wide rib can be used as a pouring portion.

Specifically, the circumferential widths W1 and W2 of the first rib 41 and the second rib 42 are wider than the circumferential widths W3 and W4 of the third rib 43 and the fourth rib 44. For example, the circumferential widths W3 and W4 of the third rib 43 and the fourth rib 44 are substantially equivalent to the circumferential widths of the ribs provided in the rotating electrical machine case (see, for example, FIGS. 7 and 8 of Patent Literature 1) of the related art and the circumferential widths W1 and W2 of the first rib 41 and the second rib 42 are wider than the circumferential width of the ribs provided in the rotating electrical machine case of the related art. For example, the circumferential widths W1 and W2 are 30 mm or more. Since the third rib 43 and the fourth rib 44 have substantially the same shape as the ribs provided in the rotating electrical machine case of the related art, detailed description thereof will be omitted.

(First Rib and Second Rib)

Information 61 or 62 is displayed on at least one of the first rib 41 and the second rib 42 having a wide circumferential width. In the following description, when the information 61 and the information 62 are distinguished, the information 61 is referred to as first information 61 and the information 62 is referred to as second information. In the embodiment, the first rib 41 displays the first information 61 and the second rib 42 displays the second information 62 which is different from the first information.

The first information is information related to the rotating electrical machine MOT and, more specifically, may include at least one piece of information such as rotating electrical machine specification information indicating the specifications of the rotating electrical machine MOT, rotating electrical machine type information indicating the type of the rotating electrical machine MOT, the manufacturer of the rotating electrical machine, the manufacturing establishment, and the date of manufacture. Further, the second information may be information related to the above-described rotating electrical machine MOT and may include product information of a product equipped with the rotating electrical machine MOT or the like. However, it is preferable that the first information 61 and the second information 62 are different.

According to such a rotating electrical machine case 1, by displaying the information 61 and the information 62 related to the rotating electrical machine MOT and the like on the ribs 41 and 42 having a wide circumferential width, the ribs 41 and 42 formed thickly to increase the rigidity can be used as an information display portion. This eliminates the need for processing to separately provide an information display portion on an outer peripheral surface or the like of the case body 10 while improving the rigidity of the rotating electrical machine case 1.

The first rib 41 and the second rib 42 have inclined surfaces 411 and 421 which extend radially inward as the first rib 41 and the second rib 42 are separated from the side wall portion 20 along the rotation axis direction and are connected to the shaft support portion 30 and the information 61 and the information 62 are displayed on the inclined surfaces 411 and 421. By displaying the information 61 and the information 62 on the inclined surfaces 411 and 421 provided on the ribs 41 and 42 in this way, the visibility of the information 61 and the information 62 is improved. That is, the information 61 and the information 62 can be visually recognized from both the rotation axis direction and the radial direction.

The information 61 and the information 62 can be engraved on the ribs 41 and 42. When the information 61 and the information 62 are engraved on the ribs 41 and 42 in this way, the information 61 and the information 62 can be configured so as not to be separated from the rotating electrical machine case 1.

Further, the information 61 and the information 62 may be sticked (adhered or welded) on the ribs 41 and 42 as labels. When the information 61 and the information 62 are sticked on the ribs 41 and 42 as labels in this way, the information 61 and the information 62 can be easily shown on the ribs 41 and 42 as compared with the case of engraving.

For example, the rotating electrical machine specification information is sticked on the first rib 41 as a label and the rotating electrical machine type information is engraved on the second rib 42. By doing so, by displaying different pieces of information 61 and 62 on the plurality of ribs 41 and 42, the plurality of pieces of information 61 and 62 can be organized and displayed.

Although various embodiments are described above with reference to the drawings, it goes without saying that the invention is not limited to such examples. It is clear that a person skilled in the art can come up with various changed examples or modification examples within the scope of the claims and it is naturally understood that the various changed examples or modification examples also belong to the technical scope of the invention. Further, each component in the above-described embodiment may be freely combined within a range that does not deviate from the gist of the invention.

For example, the rotating electrical machine case of the above-described embodiment includes two ribs having a wide circumferential width, but the number of ribs having a wide circumferential width may be one or three or more. Further, although the rotating electrical machine case of the above-described embodiment displays information on two ribs, the number of ribs for displaying information may be one or three or more.

Further, an information display portion may be separately provided on the outer peripheral surface or the like of the case body 10.

At least the following matters are described in this specification. The components and the like corresponding to those of the embodiment described above are shown in parentheses, but the invention is not limited thereto.

(1) A rotating electrical machine case (rotating electrical machine case 1) which accommodates a rotating electrical machine (rotating electrical machine MOT), the rotating electrical machine case includes,
  a case body (case body 10) having a cylindrical shape surrounding the rotating electrical machine, and
  a side wall portion (side wall portion 20) provided on at least one end side of the case body in a rotation axis direction, in which
  the side wall portion is provided with a plurality of ribs (a plurality of ribs 41 to 44) extending in a radial direction when viewed from the rotation axis direction, and
  the plurality of ribs include ribs having different circumferential widths.

According to (1), the circumferential width (thickness) of the plurality of ribs provided in the side wall portion of the rotating electrical machine case is changed, in such a manner that, by making the rib, which requires rigidity, thicker than other ribs, it is possible to improve the rigidity and suppress the increase in weight.

(2) The rotating electrical machine case according to (1), in which information (first information 61) is displayed on a rib (first rib 41) of the plurality of ribs, which is wider in the circumferential width than the other ribs (third rib 43).

According to (2), by displaying the information on the rib which is at least wide in the circumferential width, the thick rib which is formed to increase rigidity can be used as an information display portion. This eliminates the need for processing to separately provide an information display portion on an outer peripheral surface or the like of the case body.

(3) The rotating electrical machine case according to (2), further includes a shaft support portion (shaft support portion 30) having a cylindrical shape extending in a direction away from the side wall portion along the rotation axis direction, in which the rib (first rib 41) on which the information is displayed has an inclined surface (inclined surface 411) which extends radially inward as the rib (first rib 41) is separated from the side wall portion along the rotation axis direction and is connected to the shaft support portion, and the information is displayed on the inclined surface.

According to (3), visibility is improved by displaying the information on the inclined surface provided on the rib.

(4) The rotating electrical machine case according to (2) or (3), in which the information is engraved on the rib.

According to (4), by engraving the information on the rib, the information can be configured so as not to be separated from the rotating electrical machine case.

(5) The rotating electrical machine case according to (2) or (3), in which the information is sticked on the rib.

According to (5), the information can be easily shown on the rib by sticking the information on the rib.

(6) The rotating electrical machine case according to any one of (2) to (5), in which the plurality of ribs include a first rib (first rib 41) and a second rib (second rib 42) which are wider in the circumferential width than the other ribs, information related to the rotating electrical machine is displayed as the information on the first rib, and another information (second information 62) different from the information is displayed on the second rib.

According to (6), by displaying different pieces of information on the plurality of ribs, a plurality of pieces of information can be organized and displayed.

(7) A rotating electrical machine case (rotating electrical machine case 1) which accommodates a rotating electrical machine, the rotating electrical machine case includes, a case body (case body 10) having a cylindrical shape surrounding the rotating electrical machine, and a side wall portion (side wall portion 20) provided on at least one end side of the case body in a rotation axis direction, in which the side wall portion is provided with a rib (rib 41) extending in a radial direction when viewed from the rotation axis direction, and information (first information 61) is displayed on the rib.

According to (7), the rib provided in the side wall portion of the rotating electrical machine case can be used as the information display portion. This eliminates the need for processing to separately provide an information display portion on the outer peripheral surface or the like of the case body.

(8) The rotating electrical machine case according to (7), further includes a shaft support portion (shaft support portion 30) having a cylindrical shape extending in a direction away from the side wall portion along the rotation axis direction, in which the rib has an inclined surface (inclined surface 411) which extends radially inward as the rib is separated from the side wall portion along the rotation axis direction and is connected to the shaft support portion, and the information is displayed on the inclined surface.

According to (8), visibility is improved by displaying the information on the inclined surface provided on the rib.

(9) The rotating electrical machine case according to (7) or (8), in which the rib includes a first rib (first rib 41) and a second rib (second rib 42), information related to the rotating electrical machine is displayed as the information on the first rib, and another information (second information 62) different from the information is displayed on the second rib.

According to (9), by displaying different pieces of information on the plurality of ribs, a plurality of pieces of information can be organized and displayed.

REFERENCE SIGNS LIST

1: rotating electrical machine case
10: case body
20: side wall portion
30: shaft support portion
41: first rib
411: inclined surface
42: second rib
43: third rib (other rib)
44: fourth rib (other rib)
421: inclined surface
61: first information (information)
62: second information (another information)
MOT: rotating electrical machine

The invention claimed is:

1. A rotating electrical machine case which accommodates a rotating electrical machine, the rotating electrical machine case comprising:

a case body having a cylindrical shape surrounding the rotating electrical machine; and a side wall portion provided on at least one end side of the case body in a rotation axis direction, wherein:

the side wall portion is provided with a plurality of ribs extending in a radial direction when viewed from the rotation axis direction;

the plurality of ribs include ribs having different circumferential widths; and information is displayed on a rib of the plurality of ribs, which is wider in the circumferential width than the other ribs.

2. The rotating electrical machine case according to claim 1, further comprising:

a shaft support portion having a cylindrical shape extending in a direction away from the side wall portion along the rotation axis direction, wherein:

the rib on which the information is displayed has an inclined surface which extends radially inward as the rib is separated from the side wall portion along the rotation axis direction and is connected to the shaft support portion; and the information is displayed on the inclined surface.

3. The rotating electrical machine case according to claim 1, wherein
the information is engraved on the rib.

4. The rotating electrical machine case according to claim 1, wherein
the information is sticked on the rib.

5. The rotating electrical machine case according to claim 1, wherein:
the plurality of ribs include a first rib and a second rib which are wider in the circumferential width than the other ribs;
information related to the rotating electrical machine is displayed as the information on the first rib; and
another information different from the information is displayed on the second rib.

6. A rotating electrical machine case which accommodates a rotating electrical machine, the rotating electrical machine case comprising:
a case body having a cylindrical shape surrounding the rotating electrical machine; and
a side wall portion provided on at least one end side of the case body in a rotation axis direction, wherein:
the side wall portion is provided with a rib extending in a radial direction when viewed from the rotation axis direction; and
information is displayed on the rib.

7. The rotating electrical machine case according to claim 6, further comprising:
a shaft support portion having a cylindrical shape extending in a direction away from the side wall portion along the rotation axis direction, wherein:
the rib has an inclined surface which extends radially inward as the rib is separated from the side wall portion along the rotation axis direction and is connected to the shaft support portion; and
the information is displayed on the inclined surface.

8. The rotating electrical machine case according to claim 6, wherein:
the rib includes a first rib and a second rib;
information related to the rotating electrical machine is displayed as the information on the first rib; and
another information different from the information is displayed on the second rib.

* * * * *